United States Patent [19]
Manning

[11] Patent Number: 4,796,748
[45] Date of Patent: Jan. 10, 1989

[54] CONTINUOUS BUCKET CONVEYOR SYSTEM

[75] Inventor: William Manning, Burnaby, Canada

[73] Assignee: C-I-L Inc., North York, Canada

[21] Appl. No.: 104,296

[22] Filed: Oct. 5, 1987

[51] Int. Cl.[4] ............................................. B65G 17/36
[52] U.S. Cl. ................................ 198/711; 198/859; 198/703; 198/537; 198/832
[58] Field of Search ........... 198/537, 525, 549, 550.11, 198/701, 703, 706, 707, 710, 711, 712, 859, 832

[56] References Cited

U.S. PATENT DOCUMENTS

| | | | |
|---|---|---|---|
| 735,921 | 8/1903 | Webster | 198/706 |
| 1,157,658 | 10/1915 | Mashek | 198/706 X |
| 2,720,963 | 10/1955 | Stanley et al. | 198/859 X |
| 2,809,744 | 10/1957 | Hapman | 198/706 |
| 3,055,486 | 9/1962 | Meyer | 198/706 |
| 3,477,627 | 11/1969 | Webers | 198/859 X |
| 3,571,892 | 3/1971 | Levy | 198/859 X |
| 3,679,045 | 7/1972 | Morgan et al. | 198/859 X |
| 4,184,584 | 1/1980 | Dehles | 198/706 |
| 4,232,782 | 11/1980 | Ikeda | 198/706 |
| 4,493,413 | 1/1985 | Harrell | 198/708 X |

FOREIGN PATENT DOCUMENTS

| | | | |
|---|---|---|---|
| 101785 | 6/1925 | Fed. Rep. of Germany | 198/706 |
| 405431 | 8/1934 | Fed. Rep. of Germany | 198/706 |
| 695359 | 8/1953 | United Kingdom | 198/859 |
| 983237 | 2/1965 | United Kingdom | 198/859 |

Primary Examiner—Robert J. Spar
Assistant Examiner—D. Glenn Dayoan
Attorney, Agent, or Firm—Donald G. Ballantyne

[57] ABSTRACT

A continuous bucket conveyor/elevator is provided which comprises a series of buckets mounted on at least one endless cable. The cable or cables and attached buckets are urged forward by means of an adjacent driving mechanism, such as, a pneumatic or hydraulic piston, which engages contact members attached at intervals to the cables. Because no drive chains or sprocket wheels are employed, lubrication is minimized even in corrosive or abrasive environments.

1 Claim, 2 Drawing Sheets

U.S. Patent　　Jan. 10, 1989　　Sheet 2 of 2　　4,796,748
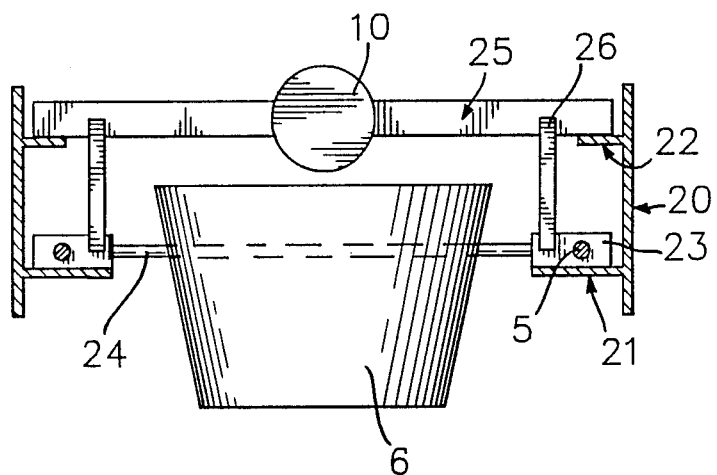
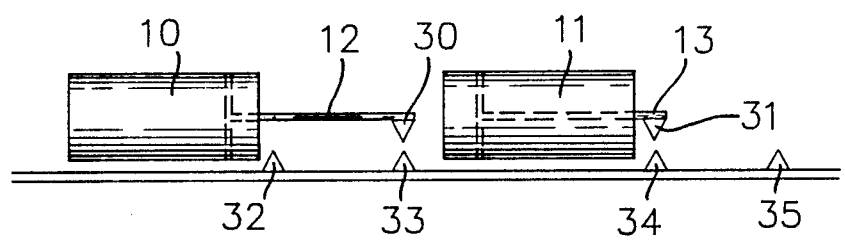

CONTINUOUS BUCKET CONVEYOR SYSTEM

BACKGROUND OF THE INVENTION

The present invention relates to bucket conveyor systems of the type having a series of bucket containers mounted upon an endless conveying means for the movement of bulk material.

Bucket conveyor systems for conveying loose or bulk material from a loading station to an unloading station are commonly known. Normally, these systems are employed when the material is to be elevated from a lower location to a higher location although such elevation may be combined with a lateral or a substantially horizontal movement. Typical bucket elevator or conveyor systems are disclosed, for example, in U.S. Pat. Nos. 4,184,584, 4,232,782 and 4,493,413.

Generally, continuous bucket conveyor systems comprise an endless belt or chain or parallel chains to which are attached a series of spaced buckets. The chains are passed around upper and lower chain wheels, one or both of which is a drive or power wheel. There may also be intermediate idler wheels to help support the chains and buckets or to provide a change in direction. Loose bulk material is loaded into the buckets at one location and discharged or tipped from the buckets at a second location. Normally, the buckets are adapted for automatic tipping and the carrier chain is powered at one or more positions to move in a unitary direction by a power source such as a sprocketed or geared drive motor.

Bucket conveyor systems employed in moving bulk or loose material frequently operate in harsh environments. The conveyance of sand, rock and the like causes heavy abrasion of moving parts while the conveyance of salt, chemicals and the like contributes to corrosion of metal components. As a result, excessive wear often takes place wherever there is contact between moving parts and, in particular, at the chain links and at the points of engagement of the chain and the drive sprockets. Suitable lubrication of the moving parts remains a continuing problem and, frequently, shutdown of the system is required because of excessive maintenance demands. The present invention provides a bucket conveyor/elevator system which substantially reduces the problems of operation and maintenance in corrosive and abrasive environments.

OBJECTS OF THE INVENTION

The principal object of the invention is to provide a continuous conveyance system for the supply of loose bulk material, horizontally, vertically or inclined, from a loading station to an unloading station.

Another object is to provide a conveyance system having no internal lubrication requirements, the only lubrication required being external bearings which may be sealed.

Yet another object is to provide an endless conveyance system wherein the drive means is external to the system.

A further object is to provide a bucket conveyance system wherein spillage of bulk material at the bucket loading location is minimized.

SUMMARY OF THE INVENTION

According to the present invention, an endless, closed loop bucket conveyor assembly is provided which comprises:

one or more endless, free-running, guided, flexible cables, for example, wire rope, synthetic fibre rope or natural fibre rope cables, for carrying buckets attached equidistantly apart therealong, said endless cables defining a first substantially horizontal charging section, a substantially vertical elevating section and a second substantially horizontal discharging section, and a hydraulic, pneumatic or mechanical driving means for continuously advancing said cables and attached buckets, the said driving means being mounted adjacent the said second horizontal section and being adapted to engage the said buckets and cables to urge the said cables and attached buckets forward.

The conveyor assembly also provides means whereby spillage at the horizontal charging section is directed towards empty buckets on the closed path cable loop.

The endless cables which comprise the closed path loop of the conveyor of the invention replace the normally employed conveyor chains or links with a consequent reduction in the need to provide lubrication thereto. The separate driving means of the invention preferably comprises one or more reciprocating, pressure operated pusher elements which eliminates the use of drive sprockets, chains, belts and the like resulting in substantially reduced maintenance costs. The use of a flexible cable also allows the elevator to turn 90° horizontal as many times as required, which is not possible with a belt or chain elevator.

BRIEF DESCRIPTION OF THE DRAWINGS

The particular features of the invention will become apparent from the following detailed description as illustrated in the accompanying drawings. The drawings are mainly conceptual in form and are intended to illustrate the principles of the invention rather than structural details which details will be obvious to one skilled in the mechanical arts.

FIG. 2 is section view taken along the line 2—2 of FIG. 1.

FIG. 3 is a side elevation conceptual view of the operating cylinders showing a means to provide reciprocating action between the cylinders.

Referring to the Figures of the drawing, FIG. 1 shows a bucket conveyor assembly mounted upon a framework (not shown except in part in FIG. 2) having a lower horizontal charging section 2, a vertical section 3 and an upper horizontal discharging section 4. The conveyor shown comprises two endless parallel cables 5 (only one of which is shown) of, for example, wire, synthetic or natural strands, to which are pivotally attached a series of buckets 6. The endless cables 5 are passed partly around freely rotating guide wheels 7A, 7B, 7C, 7D, 7E and 7F. Guide wheel 7F at the end of upper horizontal section 4 is adapted to invert or tip the buckets 6 as they pass therearound. A bulk material loading hopper is shown at 8 and a spill collection hopper is at 9. The free-running cables 5 and attached buckets 6 are urged in the direction of the arrows by means of hydraulic or pneumatic cylinders and pistons 10 and 11. An unloading hopper or shute is shown at 14.

FIG. 2 shows in greater detail the mounting of bucket 6 and cylinder 10. Parallel metal vertical frameworks 20 have mounted thereon tracks 21 and 22. Tracks 21 support free sliding blocks 23 to which the cables 5 are firmly affixed. Between blocks 23 is a support rod 24 to which bucket 6 is pivotally attached. Fixedly mounted above bucket 6 (by means not shown) and separate therefrom is cylinder 10. Attached to the forward end of piston rod 12 (FIG. 1) is pusher bar 25 which slides freely along track 22. Suspended from pusher bar 25 are pusher fingers 26. Pusher fingers 26 are adapted to engage sliding blocks 23 and to urge blocks 23 and attached bucket 6 along track 21, when cylinder 10 is energized. On the return stroke of piston rod 12, fingers 26 are adapted to rise over and clear sliding blocks 23. Cylinder 10 and cylinder 11 operate reciprocally to provide a continuous forward motion to the cables 5 and attached buckets 6.

Figure 1:
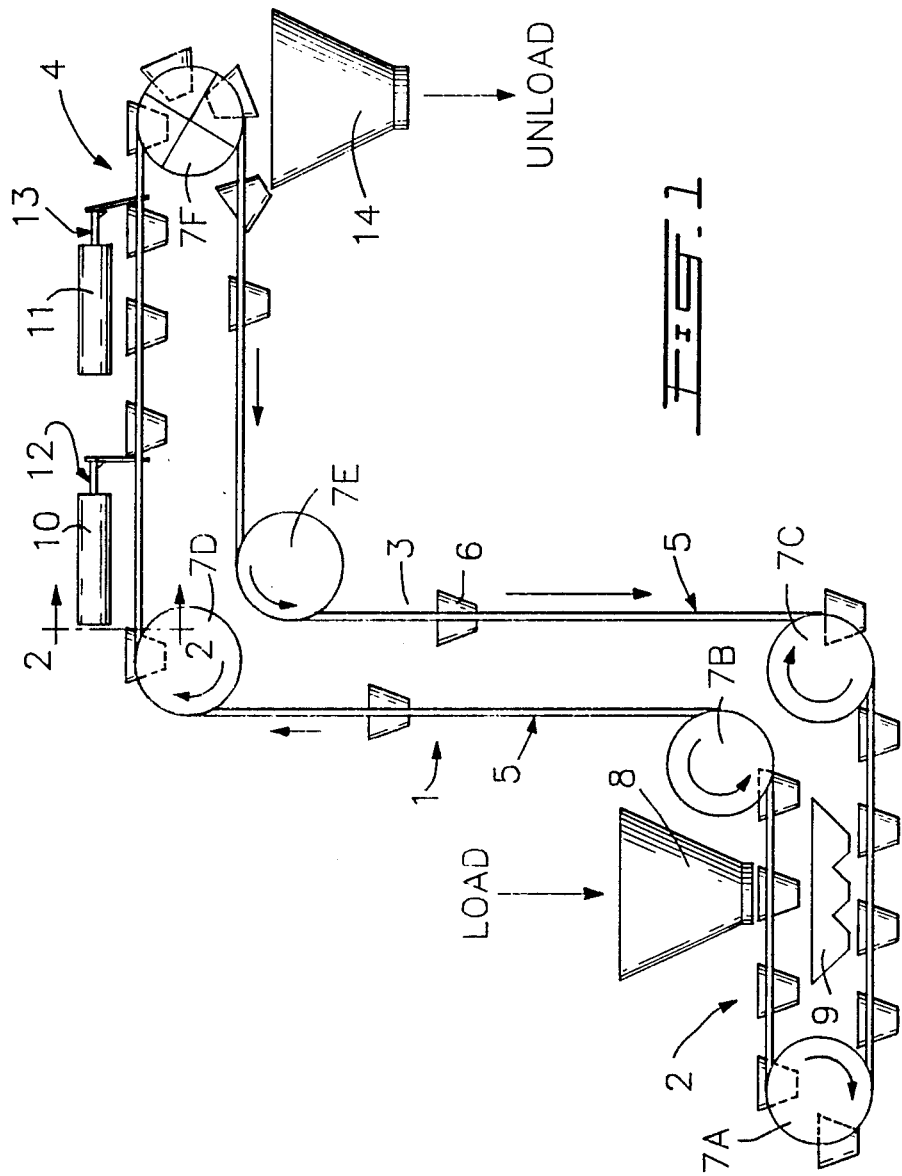
FIG. 1 is a side elevational view showing conceptually the mechanisms of the bucket conveyor of the invention.

While the forward motion of the conveyor has been described in terms of the preferred pusher cylinders 10 and 11, this is not to say that alternative drive mechanisms may not also be employed so long as the means used is substantially maintenance free. The use, for example, of a motor and attached spaced gear wheel may be employed whereby the blocks 23 may be engaged and advanced as the gear wheel is rotated. Other arrangements will occur to those skilled in the art.

The operation of the bucket conveyor system of the invention can be described with reference to the drawing. A pneumatic or hydraulic force is applied reciprocally to cylinders 10 and 11. As cylinder 10 is energized, piston rod 12 and associated pusher bar 25 and fingers 26 engage sliding blocks 23 and attached endless cables 5 urging the whole forward a distance equivalent to the piston stroke. Simultaneously, a reverse stroke is applied to cylinder 11 placing its rod 13 and associated pusher bar 25 and pusher fingers 26 in position to act in a forward direction at the instant the forward stroke of piston rod 12 is completed. Thus, the reciprocating action of cylinders 10 and 11 and piston rods 12 and 13 provide a substantially smooth and continuous forward motion to cables 5 and attached buckets 6.

With reference to FIG. 3, the two operating cylinders 10 and 11 and their associated piston rods 12 and 13 are shown. Piston rod 12 is shown in the extended position and rod 13 is fully retracted. At the end of rod 12 is a contact 30 and at the end of rod 13 is contact 31. Adjacent to contact 30 are position switches 32 and 33 and adjacent to contact 31 are position switches 34 and 35. The contact switches provide a means to operate control valves (no shown) in the lines (not shown) which deliver operating fluid to cylinders 10 and 11. At the start of operations, the cylinders are set in the positions indicated in FIG. 3 with contact 30 engaging switch 33 and contact 31 engaging switch 34. The switches 32, 33, 34 and 35 are so linked that switches 32 and 34 and switches 33 and 35 must be simultaneously engaged to permit the cylinders to advance or retract in series. As cylinder 11 is advanced, cylinder 10 retracts. Since the cylinders are identical in volume and the flow of operating fluid to the cylinders is equalized, contact 30 engages switch 32, when cylinder 10 retracts, before contact 31 impinges on switch 35 as cylinder 11 advances. The volume of operating fluid displaced in cylinder 10, because of the volume occupied by the internal piston rod 12, is slightly less than the volume of fluid displaced in cylinder 11. Cylinder 11 cannot advance until contact 31 engages switch 34 and contact 30 engages switch 32. Thus the reciprocating movement of the cylinders continues until the flow of operating fluid is interrupted.

When continuous forward movement of cables 5 has been achieved, bulk material is loaded into buckets 6 at lading hopper 8. An upper level location is provided for buckets 6 during loading so that any spillage of material can be collected and directed towards a second lower level of buckets 6 immediately below the loading position. A collection hopper 9 traps any spillage or overflow of material and channels same towards the second lower tier of buckets as shown. The endless cables 5 are passed around guide wheels 7, which are shown in minimum number. Further guide wheels can be provided as necessary to give adequate support to the assembly. After filling, the buckets 6 are moved along the lower horizontal section 2 and then rise up the vertical section 3 and, thence, along the upper horizontal section 4. At the end of the upper horizontal section 4, the buckets 6 are inverted or tipped and the contents are discharged out. After tipping, the buckets 6 resume their upright position. The tipping of buckets 6 can be achieved by one of several means known in the art.

By virtue of the endless cable construction of the conveyor of the invention and the absence of any drive motor and associated gears, chains and sprockets, lubrication requirements are reduced to a minimum. Since all guide wheels act as idler pulleys, the problems of high abrasion normally encountered in driven wheels is greatly reduced. Furthermore, the interchangeability of parts is simplified since no matching components, for example, chain and sprocket, are employed. Parts inventory is likewise simplified. Ease of access for lubrication and maintenance is provided.

The material of construction of the components may be carbon steel, abrasive resistant steel, stainless steel, plastic or any other material compatible to the material conveyed. In some instances, it may be desirable to construct the buckets 6 of a hard rubber or plastic to reduce the total weight to be moved by the pusher pistons 10 and 11.

The foregoing description and accompanying drawings are illustrative only and are not limiting. Changes and modifications to the described embodiments can be made within the scope of the invention which scope is limited only by the claims.

I claim:

1. An endless closed-loop continuous bucket conveyor elevator assembly not requiring internal lubrication comprising in combination:

one or more endless, free-running, guided flexible cables for carrying buckets pivotally attached at equidistantly spaced intervals therealong, said endless cables defining a first substantially horizontal bucket-charging section, a substantially vertical bucket-elevating section and a second substantially horizontal bucket-discharging section, and driving means for continuously advancing the said cables and attached buckets, the said driving means comprising at least two hydraulically or pneumatically operated, reciprocally-acting cylinder and piston combinations mounted adjacent the said cables and attached buckets, the said cylinder and piston combinations acting on the forward stroke of each said piston to successively engage one or more contact members attached to the said cables to continuously move the said cables and said buckets in a forward direction.

* * * * *